(12) United States Patent
Forman

(10) Patent No.: US 6,603,485 B2
(45) Date of Patent: Aug. 5, 2003

(54) COMPUTER CURSOR SPOTLIGHT

(75) Inventor: George H. Forman, Port Orchard, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 274 days.

(21) Appl. No.: 09/840,839

(22) Filed: Apr. 24, 2001

(65) Prior Publication Data

US 2002/0154141 A1 Oct. 24, 2002

(51) Int. Cl.$^7$ ................................................ G09G 5/00
(52) U.S. Cl. ........................................ 345/626; 345/157
(58) Field of Search ................................ 345/626, 157, 345/764, 767, 768, 773, 856, 857, 858, 563, 802, 741, 742, 743; 380/49

(56) References Cited

U.S. PATENT DOCUMENTS

| | | | |
|---|---|---|---|
| 6,486,869 B1 * | 11/2002 | Nakano | 345/157 |
| 6,512,607 B1 * | 1/2003 | Windsor et al. | 359/15 |
| 2002/0093514 A1 * | 7/2002 | Edwards et al. | 345/626 |
| 2002/0101437 A1 * | 8/2002 | Lafage et al. | 345/626 |

* cited by examiner

Primary Examiner—Jeffery Brier
Assistant Examiner—Faranak Fouladi

(57) ABSTRACT

The present invention provides a program code implemented computer screen security system. A virtual, real-time generated, screen mask leaves only a localized cursor area visible while hiding the remainder of the screen from public view. The cursor area automatically tracks cursor movement. In the preferred embodiment, the security program is user selectable and adjustable.

17 Claims, 2 Drawing Sheets

COMPUTER CURSOR SPOTLIGHT

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO AN APPENDIX

Not Applicable.

BACKGROUND OF THE INVENTION

1. Field of the Invention

The present invention relates generally to computer controls and more specifically to a spotlight security feature that tracks a computer cursor.

2. Description of the Related Art

With the spread of the laptop computer as a ubiquitous business tool, workers now often use their laptop in a public environment. At the same time, the information prominently displayed in the open window may constitute extremely sensitive, confidential material which can be seen by others. This is particularly true in an environment such as on an airplane or train, or in an airport or library, or even at public access computer kiosks (e.g., in bookstores, coffeehouses, and the like) where persons are tightly confined and can quite easily see what a person next to them or even a short distance away from them are displaying on the laptop screen.

Several solutions have been proffered in the prior art. Tunnel-like screen shades, or "blinders," are bulky and awkward, and do not lend themselves to a tight environment such as an airplane seat. Crystal screens by the nature of their inherent limitations have a limited field of view. However, the angle of viewing is still great enough for unwanted, surreptitious viewing, e.g., from a rearward located row in an airplane or through the crack between airplane seats from a row immediately behind the user. Heads-up displays such eyeglass displays are in the infancy of development, are expensive, and lead to eyestrain during extended use.

There is a need for a method and apparatus for providing computer screen security in an affordable and easy to use format.

BRIEF SUMMARY OF THE INVENTION

In its basic aspect, the present invention provides a method for masking a computer screen, the method including: determining current cursor screen position; and generating a virtual mask such that screen images other than those in a predetermined area around said current cursor screen position are masked from view.

In another aspect, the present invention provides a computer memory device including: program code determining current cursor screen position; and program code generating a virtual mask such that screen images other than those in a predetermined area around said current cursor screen position are masked from view.

In still another aspect, the present invention provides a security system for a computer screen employing a cursor device, the system including: a virtual mask having a first region surrounding current cursor position continuously, and a second region surrounding said first region and occupying the remainder of said screen such that said second region masks substantially all information currently displayed on said screen other than information in said first region.

In another aspect, the present invention provides a method for masking a video screen, the method including: designating a region of interest on the screen; and deploying a masking pattern over the screen except at said region of interest.

The foregoing summary is not intended to be an inclusive list of all the aspects, objects, advantages, and features of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches. Objects, features and advantages of the present invention will become apparent upon consideration of the following explanation and the accompanying drawings, in which like reference designations represent like features throughout the drawings.

The drawings referred to in this specification should be understood as not being drawn to scale except if specifically annotated.

DETAILED DESCRIPTION OF THE INVENTION

Reference is made now in detail to a specific embodiment of the present invention, which illustrates the best mode presently contemplated by the inventor for practicing the invention. Alternative embodiments are also briefly described as applicable.

Figure 1:
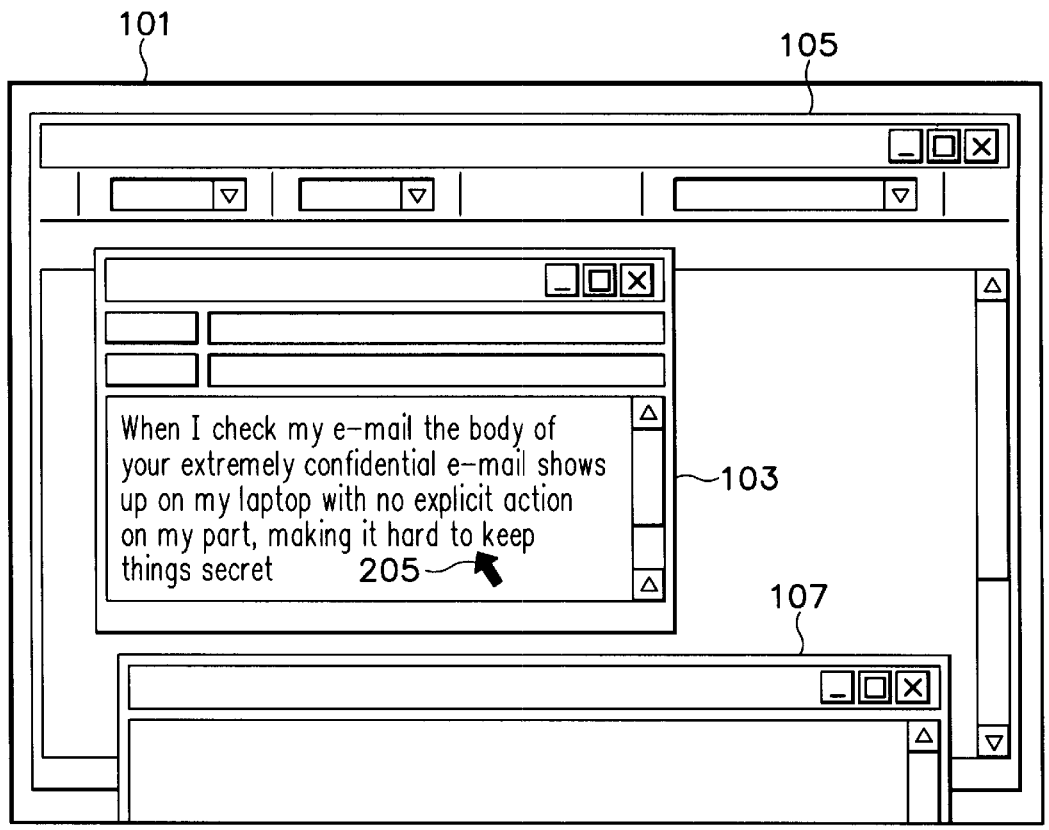
FIG. 1 (Prior Art) is a typical computer screen having a window containing user data or information.

FIG. 1 typifies a computer screen 101 (e.g., from a desktop, laptop, palmtop, personal digital assistant device, or the like computer apparatus) having various windows 103, 105, 107, and the like, of information currently displayed. Some or all of that information may be information that is confidential; that is, the displayed data content is not in, or intended for, publication to anyone other than the user of the computer. Therefore, the user, when in a public location, may wish to protect the screen for reasons as described in the Background section hereinabove.

Figure 2:
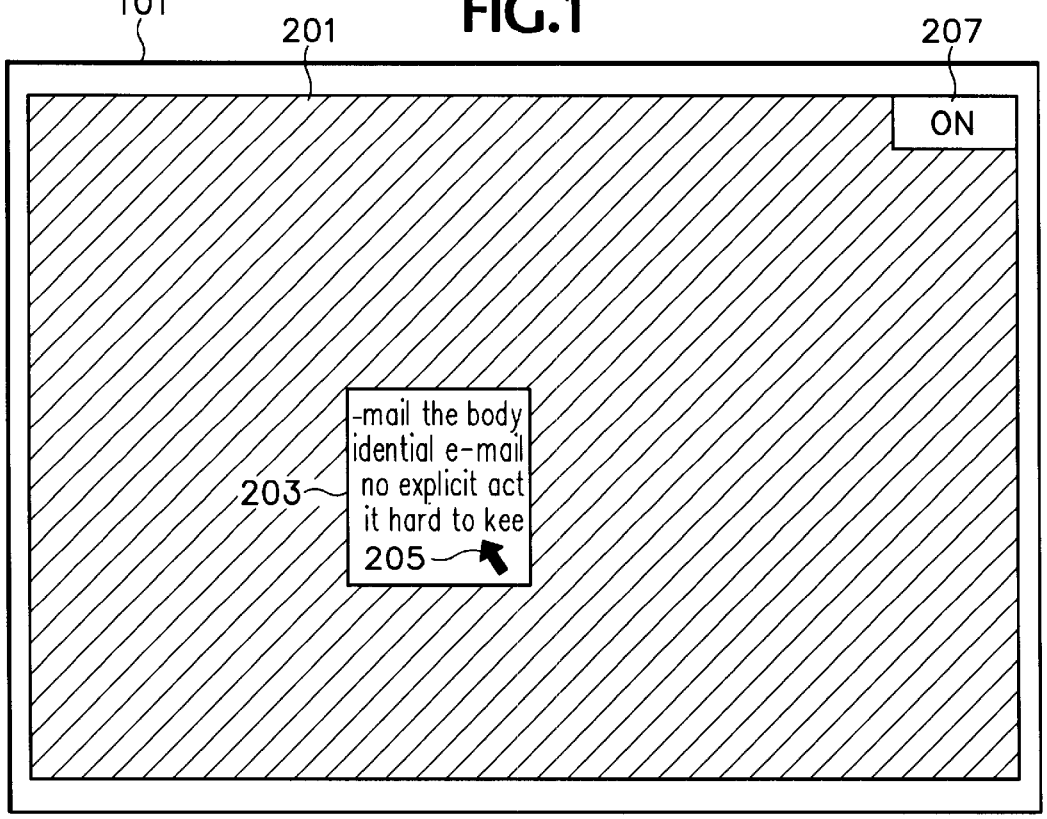
FIG. 2 is a view of the same computer screen as shown in FIG. 1 with a full screen blackout except for a small region at the cursor position in accordance with the present invention.

FIG. 2 shows the same computer screen 101 after implementation of the security system in accordance with the present invention. It is expressly intended that the present invention be implemented in software (or firmware) which can be loaded and stored in the computer apparatus itself, making the invention significantly, substantially simpler to implement and employ compared to the prior art described in the Background section hereinabove. As shown by FIG. 2, the entire screen 101 is masked, as illustrated by exemplary grey region 201 (hereinafter referred to more simply as the "mask" 201), except for a much smaller, secured, display area 203 surrounding the cursor 205 (this area hereinafter referred to more simply as the "cursor area 203") which is, namely, the immediate focus of attention of the user. Note that any artifice which prevents public viewing of the masked regions of the screen, from total blackout, to a fuzzy see-through masked limited to very close inspection to gauge approximate location of a particular set of data (i.e., which allows only the user to quickly pick a cursor target), to a custom user designed background, or the like, can be employed. Provision can be made for allowing the user to adjust the opacity of the mask 201 from total blackout to a level suited to their immediate convenience.

Cursor 205 control can be implemented by any known manner device, or combination of devices, such as the computer keyboard, mouse controls, heads-up displays (see e.g., U.S. Pat. No. 5,959,611 (Smailagic et al.) for a POR-TABLE COMPUTER SYSTEM WITH ERGONOMIC INPUT DEVICE; or U.S. Pat. No. 5,721,679 (Monson) for a HEADS-UP DISPLAY APPARATUS FOR COMPUTER-CONTROLLED AGRICULTURAL PRODUCT APPLICATION EQUIPMENT; each incorporated herein by reference), eye-tracking cursors (see e.g., U.S. Pat. No. 5,638,176 (Hobbs et al.) for an interferometric eye tracking system, also incorporated herein by reference), and the like, as would be current to the state of the art. Further detail is not necessary to an understanding of the present invention. Note however that eye-tracking cursor implementations are advantageous as the user will experience little inconvenience, if any, moving the un-secured cursor area 203 between non-contiguous regions of the screen.

Figure 3:
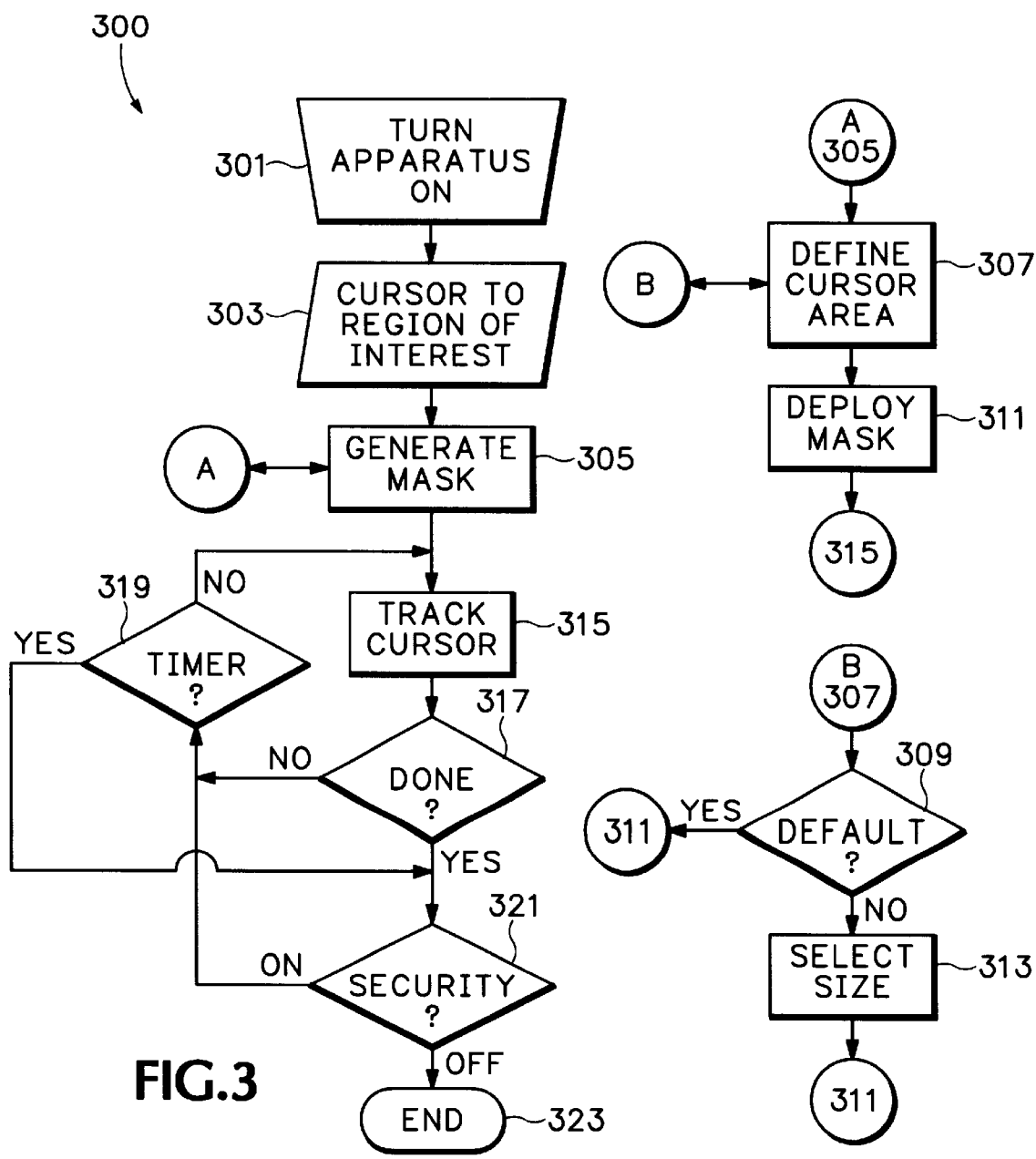
FIG. 3 is a flow chart of the computer coded process in accordance with the present invention.

Turning also to FIG. 3, a flow chart is provided to show the screen masking process 300 in accordance with the present invention which may be implemented for a specific embodiment in program code associated with the current state of the art for computer displays.

The process can begin once the computer is turned on, step 301. In the state of the art, it is common for computers to have a "suspend" mode that returns the computer and screen 101 to the exact state it was in when powered down, for example, immediately providing a display as shown in FIG. 1. Otherwise, the user goes through a normal boot-up cycle, opening applications of interest.

In a very short period of time, the user will recognize the screen region of interest and moves the cursor 205 to that region—e.g., region 203 of window 103 —in order to work with the application program data being displayed there, step 303. The security program in accordance with the present invention can be programmed to automatically implement the masking program; namely, automatically switching on mask 201 of FIG. 2 the first time the cursor 205 is located (such as turned on at a screen center default position) or moved on the screen 101 to region of user immediate interest. Alternatively, the program can be coded to have an ON-OFF virtual switch 207 provided as part of the desktop which remains visible as part of the mask itself or otherwise is visible for easy user selection (other ON-OFF functions such as a double-click mouse button may be employed, giving the user ultimate control as to when to use the security mask).

Assuming the latter as an exemplary implementation, once the cursor 205 first move 303 is made, the mask 201 is generated, step 305. In general, it is known that the cursor 205 position will be a certain known X-coordinate and Y-coordinate on the screen 201. The cursor area 203 must have a definition, step 307. As with most computer video display subroutines a default is normally provided by the software developer; e.g., a two-inch high by two-inch wide, area may be the default. Therefore, a check, step 309, is run to see if the default setting is in force. If so, the stopped cursor 205 screen position is known in an X-coordinate and Y-coordinate and the process 300 takes the automatic step of deploying the mask 201, step 311. If the default is not in force, step 309, NO-path, a selection is provide for the user, step 313. Pop-up windows and their implementation are well known in the art. The user is provided with a list of cursor area 203 sizes to select 313 from and, preferably, the ability to drag-and-drop a security area size with the mouse or other control onto the screen. The program can also provide for specifying and storing the user's custom sizes; for example, some user's may want a long narrow cursor area 203 for a specific application.

Once selected 313, the mask 201 is deployed around the cursor area 203. The cursor area 203, "$A_c$" definition is simply:

$$A_c = (x+w/2, y+h/2) \text{ to } (x-w/2, y-h/2) \qquad \text{(Equation 1)},$$

where,

"x" and "y" are the instantaneous cursor coordinates, "h" is the specified cursor "spotlight" height and "w" is the specified "spotlight" width.

Once the mask 201 is deployed and the selected cursor area 203 set, the process 300 automatically implements cursor tracking, step 315. That is, as the cursor 205, in whatever form, moves on the screen, whether by tracking such as in typing from a keyboard or by use of a mouse or via an immediate jump such as is possible with eye-tracking devices, supra, the process 300 must move the cursor area 205 and immediately redeploy the mask 201. Again, the immediate X-coordinate and Y-coordinate of the cursor 205 is known. Therefore the process 300 implements a continuous calculation for the mask area 201.

As long as the user keeps working, the masking process continues, step 317, NO-path, tracking the cursor 205 with the cursor region 203 appropriately. If the user decides to finish or should an optional default timer, step 319 note that a predetermined period has elapsed since the cursor has moved, 319, YES-path, a security check is provided, step 321. Again, a known manner pop-up window can alert the user to the options, namely turning the security mask 201 off, step 321, OFF-path, and ending the process 300, step 323, thereby returning the open screen view as in FIG. 1, or leaving the security mask on, step 321, ON-path. Note that suspend provision can be made in the program code so that any cursor movement can re-instigate the screen 101 in the secured mode such as illustrated by FIG. 2.

Note that staggered cursor tracking can be implemented. For example, for a simple word processing application it may be preferable to allow the cursor to move completely from left to right across the current cursor area 203 before shifting to a subsequent cursor area, namely to the next set of areal dimensions left to right to be filled with text.

In a refined embodiment, provision is coded into the screen security system allowing the user to de-mask regions of the computer screen selectively. Providing another virtual switch (not shown but similar to the ON-OFF function 207), drag-and-drop function, or the like, the user is allowed to open "holes" in the mask 201 at particular regions or windows. For example, window 103 in FIG. 1 may be an in-coming electronic mail message and the user is not sure whether confidential information is included or not. Therefore, masking all but the current cursor area of that window is crucial. At the same time window 105 may contain no confidential information but a continuum of data that the user needs to occasionally refer for a particular items. It would be inconvenient to have to unmask and remask window 105 for each reference to it. Therefore the user is selects to unmask window 105, or a specified region of it, while retaining the mask 201 on the remainder of the screen except for the current cursor security area 203.

Thus, the present invention provides a program code implemented computer screen security system. A virtual, real-time generated, screen mask 201 leaves only a localized cursor area 203 visible while hiding the remainder of the screen from public view. The cursor area 203 automatically tracks 315 cursor movement. In the preferred embodiment, the security program 300 is user selectable 207, 317, 319, 321 and adjustable 307, 309, 313.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element component, or method step is explicitly recited in the following claims. No claim element herein is to be construed under the provisions of 35 U.S.C. Sec. 112, sixth paragraph, unless the element is expressly recited using the phrase "means for . . ." and no process step herein is to be construed under those provisions unless the step or steps are expressly recited using the phrase "comprising the step(s) of . . ."

What is claimed is:

1. A method for masking a computer screen, the method comprising:

determining current cursor screen position; and generating a virtual mask such that screen images other than those in a predetermined area around said current cursor screen position are masked from view.

2. The method as set forth in claim 1 further comprising:

continuous tracking instantaneous cursor screen position and adjusting the virtual mask in relationship thereto.

3. The method as set forth in claim 1 further comprising:

providing default geometric dimensions for said predetermined area.

4. The method as set forth in claim 1 further comprising:

providing a plurality user generated geometric dimensions selection capabilities for said predetermined area.

5. The method as set forth in claim 1 further comprising:

providing selective regional unmasking of the screen in addition to said predetermined area.

6. Computer memory device comprising:

program code determining current cursor screen position; and program code generating a virtual mask such that screen images other than those in a predetermined area around said current cursor screen position are masked from view.

7. The device as set forth in claim 6 further comprising:

computer code continuous tracking instantaneous cursor screen position, and adjusting the virtual mask in relationship thereto.

8. The device as set forth in claim 6 further comprising:

computer code providing default geometric dimensions for said predetermined area.

9. The device as set forth in claim 6 further comprising:

computer code providing a plurality user generated geometric dimensions selection capabilities for said predetermined area.

10. The device as set forth in claim 6 further comprising:

computer code providing selective regional unmasking of the screen in addition to said predetermined area.

11. A security system for a computer screen employing a cursor device, the system comprising:

a virtual mask having a first region surrounding current cursor position continuously, and a second region surrounding said first region and occupying the remainder of said screen such that said second region masks substantially all information currently displayed on said screen other than information in said first region.

12. The system as set forth in claim 11, said second region further comprising:

a virtual switch for turning said system on and off.

13. The system as set forth in claim 11 wherein said mask is automatically deployed upon first location of said cursor following a powering up cycle.

14. The system as set forth in claim 11 further comprising:

a virtual switch for opening at least one third selective region in addition to said first region.

15. The system as set forth in claim 11 in a computing device.

16. A method for masking a video screen, the method comprising:

designating a region of interest on the screen; and deploying a masking pattern over the screen except at said region of interest.

17. The method as set forth in claim 16 comprising:

said designating a region of interest includes a predetermined geometric area adjacent a current cursor position.

* * * * *